L. DERHAMMER.
FARM GATE.
APPLICATION FILED MAR. 10, 1917.
1,262,927.
Patented Apr. 16, 1918.
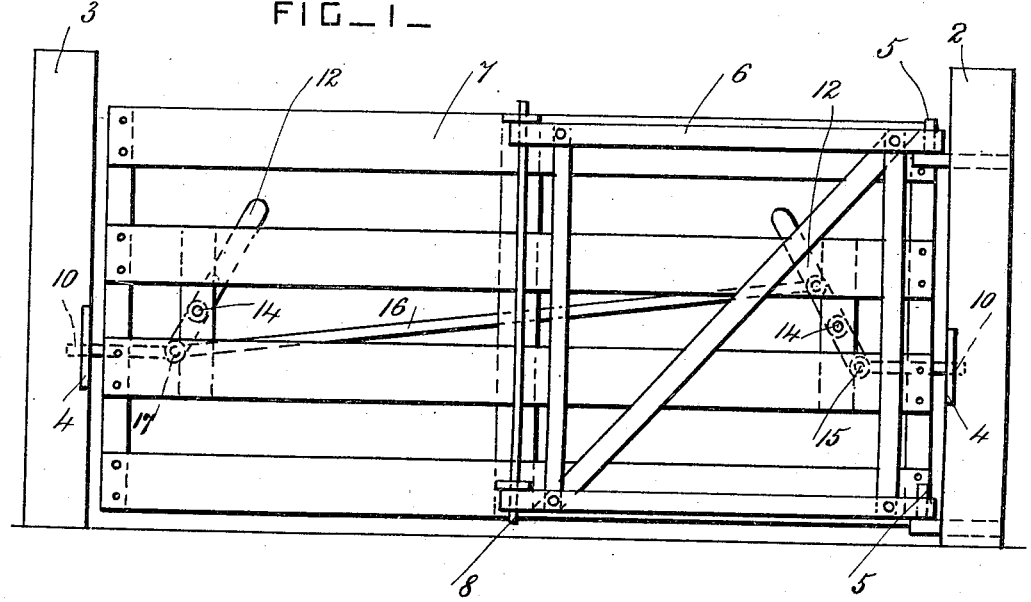
FIG_1_
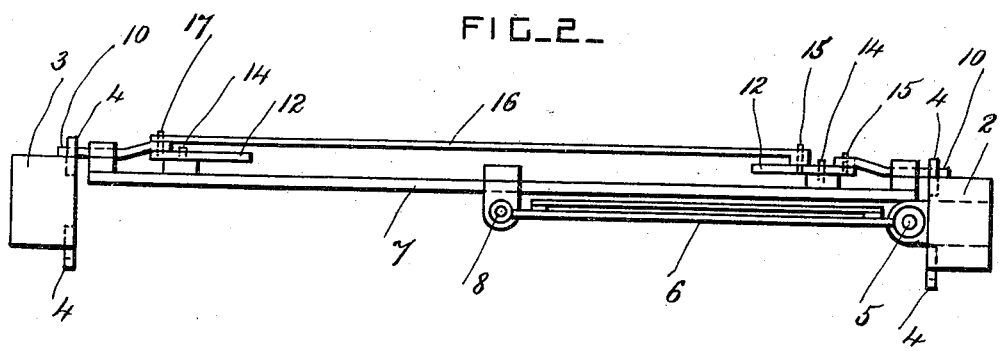
FIG_2_
Inventor
Levi Derhammer
by Herbert W. Jenner
Attorney

UNITED STATES PATENT OFFICE.

LEVI DERHAMMER, OF CHIPPEWA LAKE, OHIO.

FARM-GATE.

1,262,927.  Specification of Letters Patent.  Patented Apr. 16, 1918.

Application filed March 10, 1917. Serial No. 153,986.

*To all whom it may concern:*

Be it known that I, LEVI DERHAMMER, a citizen of the United States, residing at Chippewa Lake, in the county of Medina and State of Ohio, have invented certain new and useful Improvements in Farm-Gates; and I do hereby declare the following to be a full, clear, and exact description of the invention, such as will enable others skilled in the art to which it appertains to make and use the same.

This invention relates to gates for farms and other similar places; and it consists in the novel construction and combination of the parts hereinafter fully described and claimed.

The principal object of this invention is to provide a gate panel, for a broad roadway, of relatively lighter weight than those usually required, and at the same time very easily turned on its pivots, and which will leave the roadway wholly unobstructed when the gate is fully opened.

In the drawings, Figure 1 is a front view of a gate constructed according to this invention. Fig 2 is a plan view of the same.

The two gate posts 2 and 3 are secured in the ground on opposite sides of the road, and each of them is provided with two sockets or holes 4 for the locking-bolts of the gate latch. One of the posts 2 is also provided with projecting pivots 5. A hinge panel 6 is provided, and is pivoted at one end to the pivots 5. This hinge panel is made of sufficient length to extend about half-way across the road, and it preferably consists of a light frame of iron or steel suitably braced to stiffen it.

The gate panel 7 is made of sufficient length to extend across the road between the two gate posts, and its middle part is pivoted by a pin 8 to the free end portion of the hinge panel 6. The gate panel is preferably made of wooden bars and braces, and is of any approved construction, and it is preferably made as light as possible.

The gate panel is provided with a slidable locking-bolt 10 at each end, and each bolt can engage with either of the locking sockets 4. Levers 12 are pivoted to the gate panel by pins 14, and to the locking-bolts by pins 15. A coupling-rod 16 extends longitudinally of the gate panel, and is pivoted by pins 17 and 15 to the two levers so that the locking-bolts are constrained to move simultaneously in opposite directions. The levers afford handles for operating the locking-bolts.

When the locking-bolts are retracted the gate panel can be moved pivotally on the pin 8, and the gate and hinge panels can then be moved pivotally on the pivots 5 in either direction. The gate can be operated from either side and end, and can be opened in each direction, and as the gate panel is pivoted at its middle part it swings very freely, and can be made much lighter, without liability to sag, than gates which are pivoted at one end.

What I claim is:

In a farm gate, two gate posts each provided with two locking sockets which project in opposite directions, a hinge panel pivoted to one of the gate posts between its locking sockets, a gate panel having its middle part pivoted to the free end portion of the hinge panel and free to be turned around end for end so as to overlap it on each side, slidable locking bolts arranged at each end of the gate panel on one side thereof and adapted to engage with the sockets on each side of the gate posts as the gate panel is turned around to close the gate, levers pivoted to each end portion of the gate panel and connected to the said locking bolts, and a coupling-rod pivoted to the said levers so that the locking bolts are retracted simultaneously to effect the release of the gate panel without lifting or tilting it.

In testimony whereof I have affixed my signature.

LEVI DERHAMMER.

Copies of this patent may be obtained for five cents each, by addressing the "Commissioner of Patents. Washington, D. C."